United States Patent [19]

Chamberlin et al.

[11] Patent Number: 4,946,245
[45] Date of Patent: Aug. 7, 1990

[54] OPTICAL FILTERS

[75] Inventors: Giles R. Chamberlin, Ipswich; David B. Payne, Wickham Market; David J. McCartney, Ipswich, all of England

[73] Assignee: British Telecommunications public limited company, Great Britain

[21] Appl. No.: 358,331
[22] PCT Filed: Sep. 30, 1988
[86] PCT No.: PCT/GB88/00807
§ 371 Date: May 17, 1989
§ 102(e) Date: May 17, 1989
[87] PCT Pub. No.: WO89/03056
PCT Pub. Date: Apr. 6, 1989

[30] Foreign Application Priority Data
Oct. 1, 1987 [GB] United Kingdom ................. 8723050

[51] Int. Cl.$^5$ ............................ G02B 6/34; G02B 5/32
[52] U.S. Cl. .................................................. 350/96.19
[58] Field of Search .................... 350/96.15, 96.19, 3.7

[56] References Cited

U.S. PATENT DOCUMENTS

| | | | |
|---|---|---|---|
| 3,720,921 | 3/1973 | Schools et al. | 340/173 LH |
| 4,039,249 | 8/1977 | Kaminow et al. | 350/96.12 |
| 4,111,524 | 9/1978 | Tomlinson, III | 350/96.19 |
| 4,335,933 | 6/1982 | Palmer | 350/96.19 |
| 4,622,663 | 11/1986 | Ishikawa et al. | 350/96.19 X |
| 4,669,811 | 6/1987 | McQuoid | 350/3.7 |
| 4,671,603 | 6/1987 | McQuoid et al. | 350/96.19 X |
| 4,673,241 | 6/1987 | Nishiwaki et al. | 350/3.64 |
| 4,739,501 | 4/1988 | Fussganger | 350/96.19 X |

FOREIGN PATENT DOCUMENTS

| | | |
|---|---|---|
| 2930681 | 2/1981 | Fed. Rep. of Germany . |
| 2558607 | 7/1985 | France . |
| 2151036 | 7/1985 | United Kingdom . |
| 2168215 | 6/1986 | United Kingdom . |

OTHER PUBLICATIONS

"Dispersive Device on Polished Cladding of Single-Mode Fiber Waveguid" by Svakhin et al., Sov. J. Quantum Electron. 16(2) Feb. 1986, pp. 291–93.
"Guided-Wave Holographic Grating Beam Expander-Fabrication and Performance" by Williams, Electronics Letters, 19th Feb. 1981 vol. 17, No. 4.
"Position-Tunable Holographic filters in Dichromated Gelatin for Use in Single-Mode-Fiber Demultiplexers" by McCartney, Opticas Letters, Jun. 1985/vol. 10, No. 6.
"Investigation of Light Wave Diffraction in a Waveguide Plane by Optically Induced Dynamic Gratings" by Bykovskii et al; Sov. J. Quantum Electron, Apr. 1982, pp. 418–421.
Article entitled "Laser-Induced Refractive-Index Gratings in Eu-doped Glasses" by Durville, Behrens and Powell, Physical Review, vol. 34, No. 6, Sep. 15, 1986, pp. 4213–4220.

Primary Examiner—William L. Sikes
Assistant Examiner—Akm E. Ullah
Attorney, Agent, or Firm—Nixon & Vanderhye

[57] ABSTRACT

An optical filter includes a volume diffraction grating provided within a waveguide. The grating has a thickness T sufficient such that when an optical beam R is incident on the grating from outside the waveguide, wavelengths at or near the Bragg wavelength for the grating are diffracted and coupled into the waveguide, all but the first order interferences being substantially eliminated, while wavelengths away from the Bragg wavelength pass through the waveguide substantially undiffracted. The grating pitch L may be varied to permit tuning of the filter response.

9 Claims, 5 Drawing Sheets

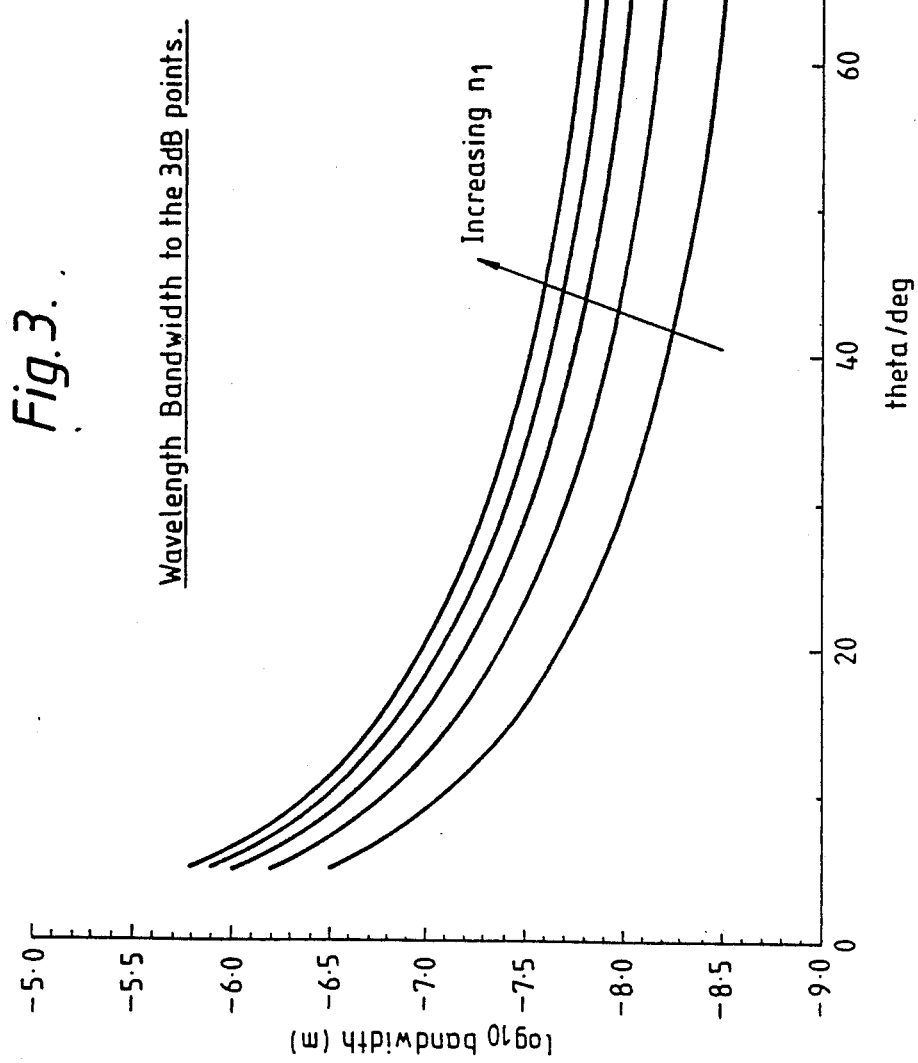

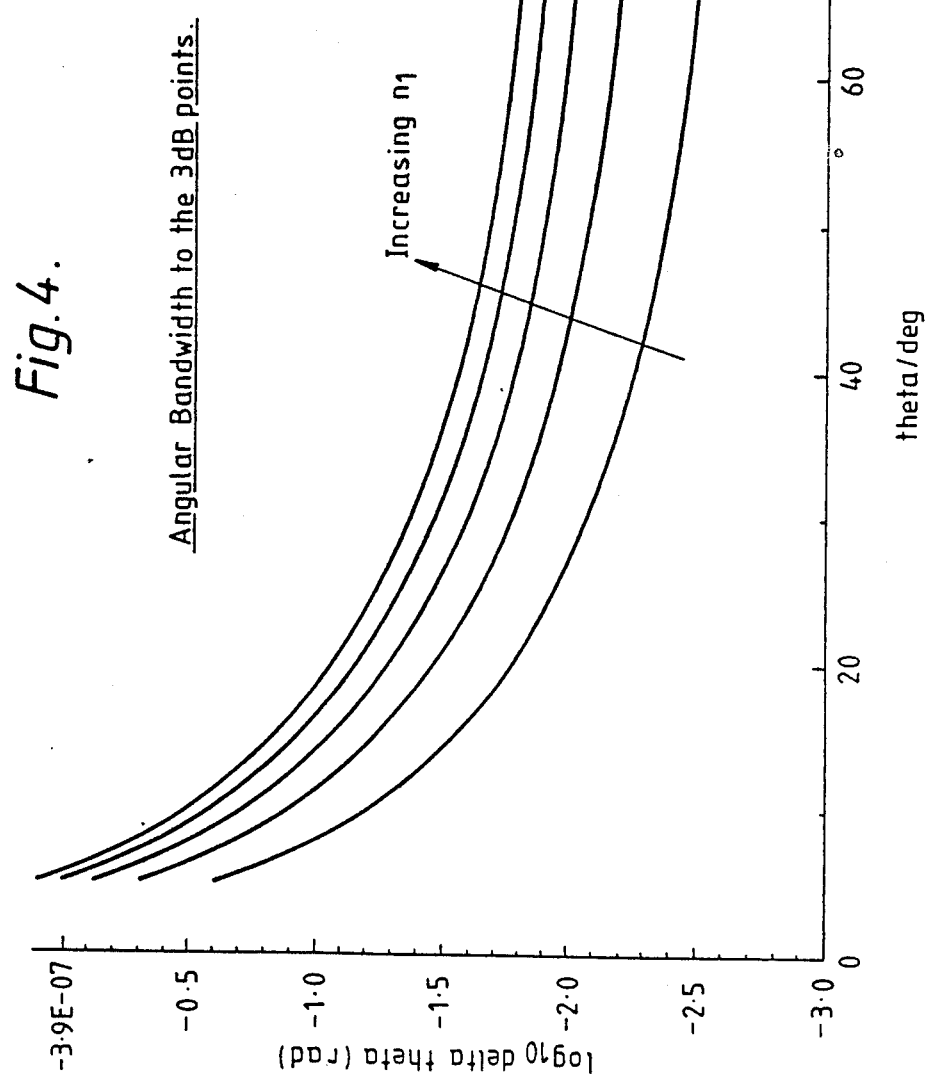

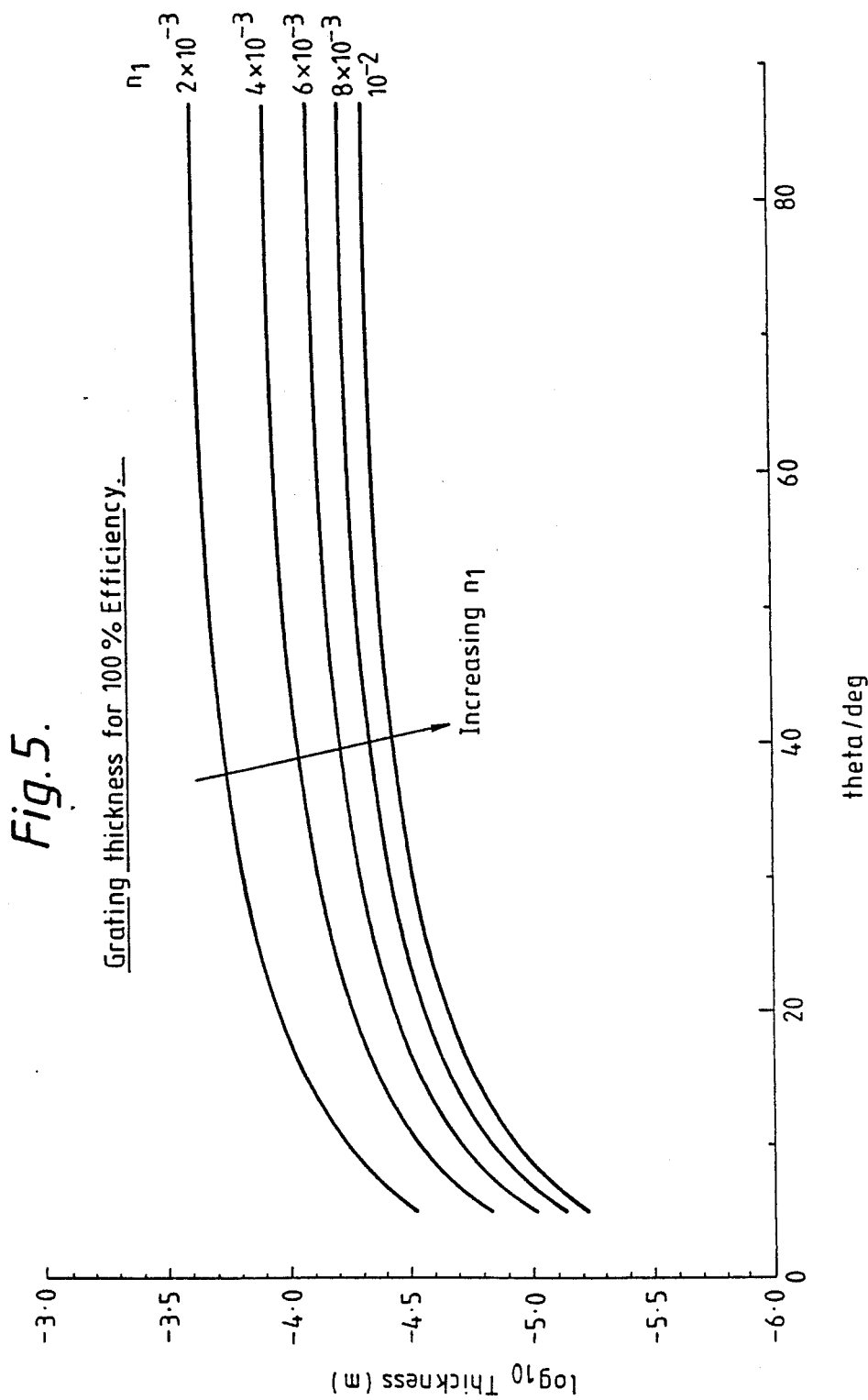

OPTICAL FILTERS

BACKGROUND OF THE INVENTION

1. Field of the Invention

The invention relates to optical filters.

2. Related Prior Art

Volume reflection grating filters have been proposed for use in wavelength multiplexed optical systems. An example of such a filter is described in published U.K. Patent Application GB No. 2151036. However, such reflection filters are difficult to implement in practice since an incident light beam is reflected back towards the launch direction making it difficult to couple the filtered wavelength into a detector or other output device. Furthermore, with reflection filters, once a desired wavelength has been selected by the grating, the filtered wavelength must generally be separately focussed into an output optical fiber for onward transmission.

SUMMARY OF THE INVENTION

In accordance with the present invention, an optical filter comprises an optical waveguide within which is provided a volume diffraction grating of refractive index modulations, the grating having a thickness sufficient such that when an optical beam is incident on the grating from outside the waveguide, wavelengths in a predetermined range at or near the Bragg wavelength for the grating are diffracted and coupled into the waveguide, all but the first order diffractions being substantially eliminated, whilst wavelengths away from the Bragg wavelength pass through the waveguide substantially undiffracted.

The filter according to the invention makes use of the wavelength selectivity of a volume diffraction grating in which light at one wavelength can be efficiently diffracted whilst light of a second wavelength passes through the diffraction grating with no effect. The thickness of the grating enables diffraction of harmonic wavelength components to be eliminated (i.e. higher than first order diffractions are suppressed). Preferably Q is greater than about 10 where $Q = 2\pi\lambda t/nd^2$, d being the fringe spacing. Moreover, by appropriately varying the grating thickness, the bandwidth of the range of wavelengths at or near the Bragg wavelength which is efficiently diffracted by the grating at a given angle of incidence of the input beam may be conveniently adjusted as desired. The present filter is further distinguished from the conventional reflection gratings of GB No. 2151036 since the grating is provided in a waveguide. This enables a relatively thick (in the direction of grating normal) grating to be constructed providing the advantage of narrower bandwidth operation. In addition the direct coupling between the grating and waveguide results in a much simpler overall construction.

In order to achieve good coupling into the waveguide the grating modulations are conveniently established in planes extending at least in one direction normal to the preferred axis of propagation in the waveguide and extending in another direction, orthogonal to the one direction, at an angle $\pi/2 - \phi$ with respect to the axis of propagation.

For coupling from an external optical beam into the waveguide the grating inclination $\phi$ should be less than $\pi/2$. In operation the optical beam should then be incident at an angle $\pi/2 - \theta$ to the axis of propagation, where $\theta < \phi$ and $\theta = 2\phi - \pi/2$. For a given grating thickness, the coupled bandwidth is narrower the closer $\theta$ approaches to $\pi/2$. For narrowband operation, it is therefore generally preferable for $\phi$ (and thus $\theta$) to be as close to $\pi/2$ as possible.

However, as $\phi$ approaches $\pi/2$, the required inclination $\theta$ of the input beam also approaches $\pi/2$. In these circumstances, as $\theta$ increases, in the absence of efficient, index-matched coupling between the input beam and the waveguide, an increasing proportion of the input beam is simply reflected away from the waveguide before interaction with the grating leading to a corresponding reduction in the amount of light available for coupling into the waveguide. Practically, therefore, it is necessary to find a compromise. Without taking special steps towards index matching, it has been found that a satisfactory balance between narrowness of bandwidth and the proportion of coupled power is obtainable for angle $\phi$ of approximately $5\pi/12$ ($\theta \sim \pi/3$).

Preferably, the grating pitch varies along the waveguide, the wavelength band which is diffracted depending on the grating pitch at the position of incidence of the optical beam.

Preferably, the filter further comprises light guide means for guiding the light beam onto the grating, and tuning means to effect a relative movement of the light guide means and the grating, whereby the filter can be tuned to diffract a predetermined wavelength by suitably positioning the light guide means and the grating relative to one another.

The volume nature of the grating and variation in the grating pitch allow a tunable filter to be conveniently implemented. Since the pitch varies along the waveguide a beam diffracted by one section of the grating will not be affected by other parts of the grating.

Furthermore, the filtered beam will exit from the grating along the waveguide and thus will not interfere with the input optical beam or the input beam optics. Similarly, the input beam will not interfere with the output beam or output beam optics leading to considerable ease of use.

The filter has particular advantage for use as a channel selection or a channel dropping filter in wavelength multiplexed (WDM) fibre optic networks.

The filter can be incorporated in an optical device including an auxiliary waveguide onto which the filter is mounted, the arrangement being such that a beam diffracted by the filter grating in use is coupled into the auxiliary waveguide.

In this specification, the term optical is intended to refer to that part of the electro-magnetic spectrum which is generally known as the visible region together with those parts of the infrared and ultraviolet regions at each end of the visible region which are capable of being transmitted by dielectric optical waveguides such as optical fibres.

BRIEF DESCRIPTION OF THE DRAWINGS

Embodiments of an optical filter in accordance with the present invention and methods of operation will now be described with reference to the accompanying drawings, in which:

FIGS. 3 and 4 are graphs illustrating the wavelength and angular sensitivity of filters according to the invention;

FIG. 5 is a graph showing the grating thickness required for 100% diffraction efficiency;

DETAILED DESCRIPTION OF EXEMPLARY EMBODIMENTS

Figure 1:
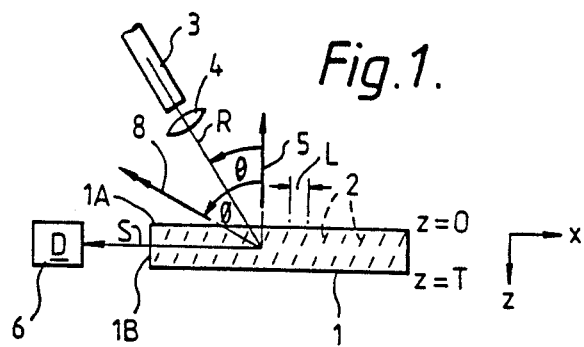
FIG. 1 is a schematic diagram of an embodiment of a filter according to the invention.

The filter shown in FIG. 1 comprises a film 1 defining a volume (phase) diffraction grating having a series of slanted diffraction planes 2, the grating normal 8 to the diffraction planes 2 extending in the zx plane of the film. In operation, an incident optical beam is transmitted along an optical fibre 3 via a collimating lens 4 which directs the beam onto a first surface 1A of the film 1 at an angle $\theta$ to the film normal 5. The grating normal 8 is at an angle $\phi$ to the film normal 5. In this case components of the incident light beam at the relevant wavelength(s) are diffracted with the first order diffracted beam S being transmitted at right angles to the film normal 5. As shown in FIG. 1, the diffracted beam S then passes via an end surface 1B of the grating waveguide 1 to an optical detector 6. Alternatively, for example, the diffracted beam could be coupled directly into another optical waveguide. The remaining wavelengths pass undiffracted straight through the grating 1.

As illustrated, the grating is of fixed pitch and consequently the wavelength response for a given incident angle $\theta$ is substantially the same wherever the input beam R is incident on the grating. It is possible to vary the pitch along the length of the grating to provide a so-called chirped grating. In such a case the grating pitch is made locally periodic over distances of the order of the width of the input beam but changes over longer distances. This enables the response of the filter to be turned simply by translanting the input optical fibre 3 and converging lens 4 lengthwise along the grating 1 so that the light beam R is incident on a section of the grating 1 with a pitch appropriate for the desired filtering response.

To explain the device response it is helpful to consider a simplified mathematical analysis as presented below.

Figure 2:
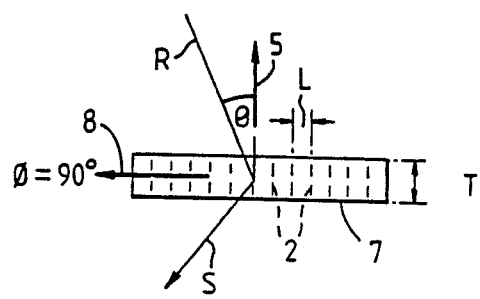
FIG. 2 illustrates schematically an unslanted volume diffraction grating.

The device shown in FIG. 1 is not immediately amenable to analysis by using Kogelnik's coupled wave theory ("Coupled wave theory for thick hologram gratings" H. Kogelnik, Bell System Technical Journal, vol 48, No. 9, pp 2909 Nov. 1969.) This theory requires the S wave to propagate in the z direction, which allows a solution to the wave equations to be found at the boundary z=T, after propagation through the thickness T of the grating (see FIG. 1). However, this is not a fundamental physical limitation and rotation of the axes allows a solution to be obtained which is applicable to the present filter. For convenience, therefore, the geometry that will be analysed here is that of the unslanted grating 7 shown in FIG. 2 (where $\phi = 0$). The diffraction efficiency $\eta$ for this arrangement is given by $$\eta = \frac{\sin^2(v^2 + \epsilon^2)^{\frac{1}{2}}}{(1 + \epsilon^2/v^2)} \text{ where } v = \frac{\pi n_1 T}{\lambda \cos\theta} \text{ and}$$

$$\epsilon = \frac{\Delta\theta K T \sin\theta}{2\cos\theta} \text{ or } \epsilon = \frac{-\Delta\lambda K^2 T}{8\pi n_0 \cos\theta}$$

and the grating constant $K$ is given by $K = \frac{2\pi}{L}$ and the Bragg condition is $\sin\theta = \frac{\lambda}{2L}$ $\Delta\lambda$ and $\Delta\theta$ represent the deviations in $\lambda$ and $\theta$ from the Bragg condition. From these results, it is apparent that appropriate values of grating pitch L, base refractive index $n_o$ and index modulation $n_1$ may be selected such that the grating has 100% diffraction efficiency at a given wavelength $\lambda$, input at angle $\theta$.

For a fixed set of grating parameters, it is possible to determine the angular and wavelength sensitivity of the filter structure. FIG. 3 shows a series of response curves for different index modulations $n_1$ and for different incident angles $\theta$ illustrating how the bandwidth is narrowed as $\theta$ is increased and as the index modulation $n_1$ is decreased. FIG. 4 shows a similar series of curves illustrating a corresponding change in angular bandwidth $\Delta\theta$. FIG. 5 shows the grating thickness required to achieve 100% diffraction efficiency under the given conditions.

For a given index modulation $n_1$, the operational bandwidth is narrower as $\theta$ approaches $\pi/2$. However, as $\theta$ increases, particularly above about $\pi/3$, reflection losses at the boundary interface with the waveguide rise proportionately more rapidly. Therefore, unless special measures are taken to reduce such losses, for example by using suitable index matching techniques, there is little to be gained by increasing $\theta$ above $\pi/3$ (as can be seen from FIGS. 3 to 5).

From a straightforward geometrical analysis it can be seen that for light to be coupled into the waveguide then the grating slant angle $\phi$ must be greater than the angle of beam incidence $\theta$ and the two angles must be related such that $\theta = 2\phi - \pi/2$. It will also be seen that the required grating thickness is reduced as $\phi - \theta \to 0$.

Figure 6:
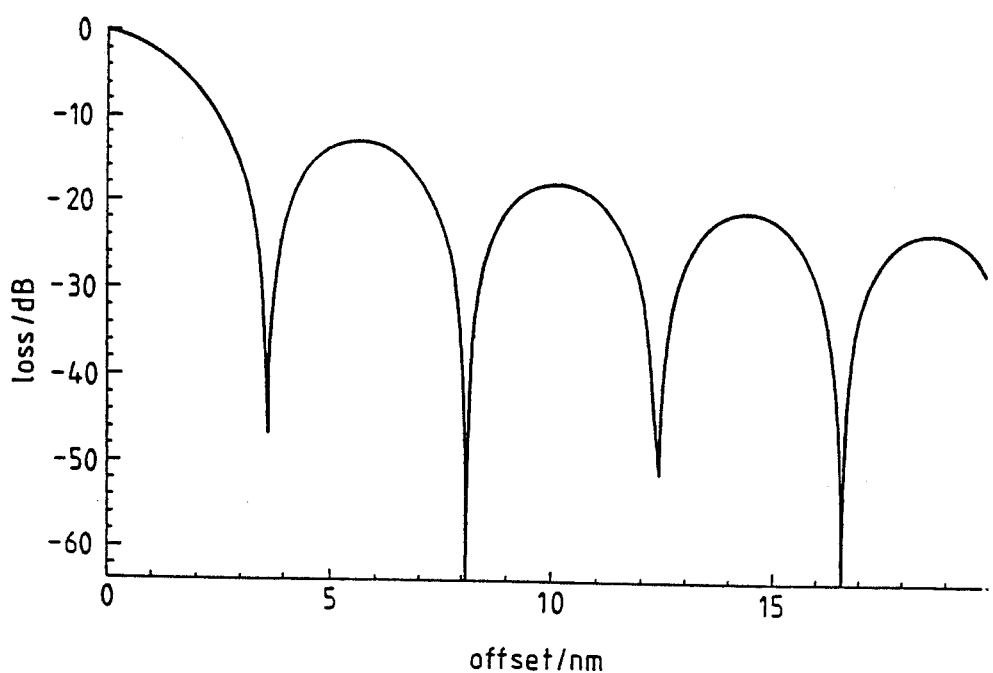
FIG. 6 is a graph of the spectral response of a filter according to the invention.

Given the above restrictions, for $\phi = 5\pi/12$ and $\theta = \pi/3$, FIG. 6 illustrates the spectral response of a filter according to the invention with index modulation $n_1$ of $2 \times 10^{-2}$ and a grating length of 200 $\mu$m with a centre wavelength of 1.3 $\mu$m. The response is of the form $\sin(x)/x$ with a series of decreasing maxima. The relative amplitude of these peaks may be adjusted by varying the index modulation. (The analysis after Kogelnik assumes a sinusoidal variation.)

The volume diffraction grating may be provided in a waveguide which comprises a suitable holographic medium, such as for example dichromated gelatin (DCG). Waveguides comprising optically non-linear materials having stable non-linear states (i.e. non-linearity decay times relatively longer than the duration of an optical input requiring filtering) may also be used. Waveguides of the kind described in copending patent application GB No. 8722014 in the name of the present applicants may be suitable.

Figure 8:
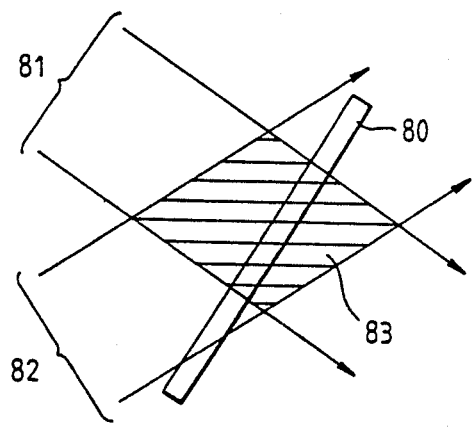
FIGS. 8 and 9 are schematic diagrams showing how a volume diffraction grating may be written in a waveguide.

FIG. 8 illustrates schematically how the slanted volume diffraction grating for a fixed wavelength filter may be written in a waveguide. In this case, the waveguide 80 is placed at an appropriate angle in the zone of interference 83 between two collimated laser beams

Figure 9:
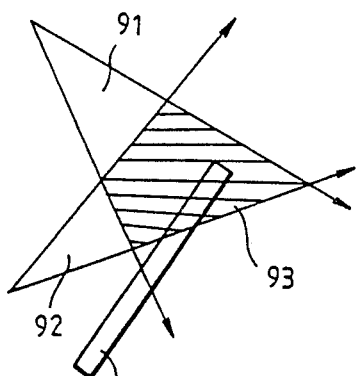

81,82. FIG. 9 shows one method by which a chirped volume diffraction grating for a tunable filter may be produced. As before, a waveguide 90 with suitable holographic properties is positioned similarly in the interference zone 93 between two laser beams 91,92. However, in this instance the beams are made to diverge to create the desired chirping in the fringes.

Figure 7:
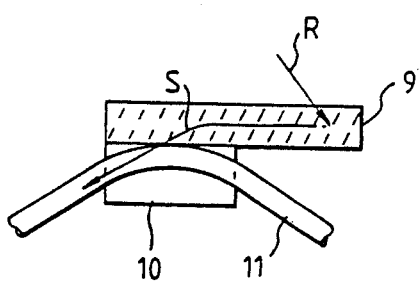
FIG. 7 illustrates an optical device including the filter of FIG. 1.

Filters according to the invention may conveniently be used with other optical components. FIG. 7 illustrates an optical device incorporating the filter of FIG. 1 together with an auxiliary waveguide comprising a conventional optical fibre. The filter (referenced 9) is incorporated into a polished coupler 10 with a conventional optical fibre 11. When a beam R is incident on the filter, the diffracted, filtered beam S is then coupled into the optical fibre 11 as indicated by the arrowed path.

We claim:

1. An optical filter comprising:
   an optical waveguide within which is provided a volume diffraction grating of refractive index modulations,
   the grating having a thickness sufficient such that when an optical beam is incident on the grating from outside the waveguide, wavelengths at or near a predetermined Bragg wavelength for the grating are diffracted and coupled into the waveguide, all but the first order diffraction being substantially eliminated, while wavelengths away from the Bragg wavelength pass through the waveguide substantially undiffracted.

2. An optical filter according to claim 1, wherein the grating modulations are established in planes extending at least in one direction substantially normal to the preferred axis of propagation in the waveguide and extending in another direction, orthogonal to the one direction, at an angle $\pi/2 - \phi$ with respect to the axis of propagation, where $\phi$ is less than $\pi/2$.

3. An optical filter according to claim 2, wherein $\phi$ is not more than $5\pi/12$.

4. An optical filter according to claim 1 wherein the diffraction grating has a pitch which varies along the waveguide.

5. An optical filter according to claim 1 further comprising light guide means for guiding a light beam onto the grating, and tuning means to effect a relative movement of the light guide means and grating, whereby the filter can be tuned to diffract a predetermined wavelength by suitably positioning the light guide means and grating relative the one another.

6. An optical filter according to claim 1 wherein the waveguide comprises an optical fibre having a core containing an optically non-linear medium.

7. An optical device comprising a filter according to claim 1, and an auxiliary waveguide onto which the filter is mounted, the arrangement being such that the beam diffracted by the filter grating in use is coupled into the auxiliary waveguide.

8. Apparatus for selectively diffracting optical signals of predetermined wavelength, said apparatus comprising:
   a volume diffraction grating disposed within an optical waveguide having a longitudinal axis along which said diffraction grating is also disposed; and
   optical input means for directing input optical signals including signals over a range of different wavelengths, into said waveguide at an acute, non-zero, angle with respect to a normal to said longitudinal axis;
   said diffraction grating having a sufficient thickness dimension transverse to said longitudinal axis to cause input optical signals of the said predetermined wavelength to be diffracted and to pass along said longitudinal axis within the waveguide while other input optical signals having other wavelengths are not so diffracted.

9. Method for selectively diffracting optical signals of predetermined wavelength, said method comprising:
   disposing a volume diffraction grating within an optical waveguide having a longitudinal axis along which said diffraction grating is also disposed; and
   directing optical input signals including signals over a range of different wavelengths, into said waveguide at an acute, non-zero, angle with respect to a normal to said longitudinal axis;
   providing a sufficient thickness of said diffraction grating transverse to said longitudinal axis to cause input optical signals of said predetermined wavelength to be diffracted and to pass along said longitudinal axis within the waveguide while other input optical signals having other wavelengths are not so diffracted.

* * * * *